(12) United States Patent
Chang

(10) Patent No.: US 9,510,618 B2
(45) Date of Patent: Dec. 6, 2016

(54) JUICE EXTRACTING DEVICE

(71) Applicant: Tsung Chih Chang, Taichung (TW)

(72) Inventor: Tsung Chih Chang, Taichung (TW)

( * ) Notice: Subject to any disclaimer, the term of this patent is extended or adjusted under 35 U.S.C. 154(b) by 671 days.

(21) Appl. No.: 14/044,890

(22) Filed: Oct. 3, 2013

(65) Prior Publication Data

US 2015/0068411 A1 Mar. 12, 2015

(51) Int. Cl.
*A47J 19/02* (2006.01)
*A23N 1/00* (2006.01)
*A23N 4/18* (2006.01)

(52) U.S. Cl.
CPC ............... *A23N 1/003* (2013.01); *A23N 4/18* (2013.01); *A47J 19/02* (2013.01)

(58) Field of Classification Search
CPC .... A23N 4/12–4/20; A23N 1/003; A47J 19/02
USPC ............................ 99/513, 495, 501, 503, 508
See application file for complete search history.

(56) References Cited

U.S. PATENT DOCUMENTS

| 1,290,262 | A | * | 1/1919 | Lyttle | A47J 19/022 99/508 |
| 1,509,981 | A | * | 9/1924 | Rice | A47J 19/022 99/508 |
| 1,563,413 | A | * | 12/1925 | Whitcomb | A47J 43/27 220/568 |
| 1,748,483 | A | * | 2/1930 | Stillman | A47J 43/27 220/568 |
| 1,922,773 | A | * | 8/1933 | Maull | A47J 19/022 100/108 |
| 2,116,325 | A | * | 5/1938 | Rogers | A47J 19/022 100/108 |
| 2,176,377 | A | * | 10/1939 | Gamble | A47J 43/22 222/192 |
| 2,183,804 | A | * | 12/1939 | Bloomfield | A47J 19/022 100/213 |
| 2,212,328 | A | * | 8/1940 | Scurlock | A47J 19/022 99/497 |
| 2,283,119 | A | * | 5/1942 | Kuhlman | A47J 19/022 210/419 |
| 2,486,423 | A | * | 11/1949 | Krieger | A47J 19/022 99/508 |
| 2,701,593 | A | * | 2/1955 | Dootson | A47J 19/022 99/506 |
| 2,733,746 | A | * | 2/1956 | Kuehn | A47J 25/00 211/14 |
| 2,781,069 | A | * | 2/1957 | Byrd | A47J 19/022 73/426 |
| 4,125,064 | A | * | 11/1978 | Ackeret | A47J 19/022 99/505 |
| 4,309,944 | A | * | 1/1982 | Frost, Jr. | A23N 1/003 100/104 |

(Continued)

*Primary Examiner* — Sean Michalski

(57) ABSTRACT

A juice extracting device contains a collecting assembly, a covering set, a body, and a pumping member. The collecting assembly includes a cavity defined, an open segment having a pouring hole, a collection segment having a guiding hole, and at least one limiting seat. The covering set includes a hollow neck and a circular holder. The body includes a filtering disc, a plurality of defining ribs for retaining with the at least one limiting seat, a hollow column; a hollowly conical post having a cutting edge, a stop piece, and an extraction portion. The pumping member is served to draw juices in the collecting assembly and includes a spray head and a drawing tube for drawing the juices.

7 Claims, 10 Drawing Sheets

(56) References Cited

U.S. PATENT DOCUMENTS

| | | | | |
|---|---|---|---|---|
| 5,088,392 | A * | 2/1992 | Ancona | A47J 43/25 220/4.03 |
| 5,551,335 | A * | 9/1996 | McClean | A47J 19/02 99/501 |
| 5,662,032 | A * | 9/1997 | Baratta | A47J 43/0722 210/380.1 |
| 6,070,519 | A * | 6/2000 | Sham | A47J 19/02 99/348 |
| 6,539,848 | B2 * | 4/2003 | Wang | A47J 19/022 99/506 |
| 6,568,319 | B2 * | 5/2003 | Schrader | A23N 1/003 100/108 |
| 6,805,043 | B2 * | 10/2004 | Lokhandwala | A23N 1/003 100/108 |
| 6,880,455 | B1 * | 4/2005 | Ghaedian | A23L 1/2123 99/348 |
| 7,487,721 | B2 * | 2/2009 | Amador | A23N 1/003 100/108 |
| 8,613,402 | B2 * | 12/2013 | Lefkovitz | A47J 19/06 241/100 |
| 8,783,171 | B2 * | 7/2014 | Lin | A23N 1/003 100/130 |
| 9,095,169 | B1 * | 8/2015 | Foley | A23N 1/003 |
| 2007/0237864 | A1 * | 10/2007 | McCarthy | A23D 7/003 426/115 |
| 2011/0219959 | A1 * | 9/2011 | Hauser | A47J 19/022 99/508 |
| 2012/0288602 | A1 * | 11/2012 | Diatlo | A23L 2/04 426/489 |
| 2015/0068411 | A1 * | 3/2015 | Chang | A47J 19/02 99/513 |
| 2015/0245726 | A1 * | 9/2015 | Henry | B26B 11/00 99/506 |

\* cited by examiner

JUICE EXTRACTING DEVICE

FIELD OF THE INVENTION

The present invention relates to a juice extracting device which is capable of extracting the juices variously.

BACKGROUND OF THE INVENTION

A juice extractor disclosed in U.S. Pat. Nos. 2,212,328 and 2,733,746 is used to extract fruit, such as lemon. However, the fruit has to be peeled by a peel remover in advance, and then pulp of the fruit is crushed to extract juices, thereafter the juices are applied on food. In other words, the conventional juice extractor cannot peel the peel of the fruit and spray the juices on the food directly.

The present invention has arisen to mitigate and/or obviate the afore-described disadvantages.

SUMMARY OF THE INVENTION

The primary object of the present invention is to provide a planetary limit switch which is capable of overcoming the shortcomings of the conventional juice extracting device.

To obtain the above objective, a juice extracting device provided by the present invention contains: a collecting assembly, a covering set, a body, and a pumping member.

The collecting assembly is used to collect juices and includes a cavity defined therein, an open segment formed on a top end of the cavity and having a pouring hole arranged around an inner wall of the open segment, a collection segment formed on a bottom end of the cavity and having a guiding hole defined in the collection segment, and at least one limiting seat disposed in the cavity adjacent to the open segment.

The covering set is covered on the guiding hole and includes a hollow neck and a circular holder connecting with the hollow neck and used to support the collecting assembly.

The body is applied to hold the collecting assembly and includes a filtering disc; a plurality of defining ribs arranged around an outer peripheral side of the filtering disc so as to retain with the at least one limiting seat; a hollow column extending outwardly from a central portion of a top end of the filtering disc; a hollowly conical post extending outwardly from a central portion of a bottom end of the filtering disc and communicating with the hollow column, wherein the hollowly conical post has a cutting edge arranged on a distal end thereof, the hollowly conical post also has a stop piece horizontally mounted on a predetermined portion of the cutting edge so as to stop a peel which is peeled from a fruit; the hollowly conical post further has an extraction portion formed on an outer wall thereof so as to cut and crush the fruit and has plural first meshes defined thereon.

The pumping member is served to draw the juices in the collecting assembly and includes a spray head and a drawing tube for drawing the juices.

Accordingly, the juice extracting device of the present invention is capable of extracting the juices variously.

Preferably, the stop piece stops the peel so that the juice extracting device extracts the juices without impurities.

In addition, the crushing fork of each cutter crushes the pulp of the fruit strongly.

DETAILED DESCRIPTION OF THE PREFERRED EMBODIMENTS

Figure 1:
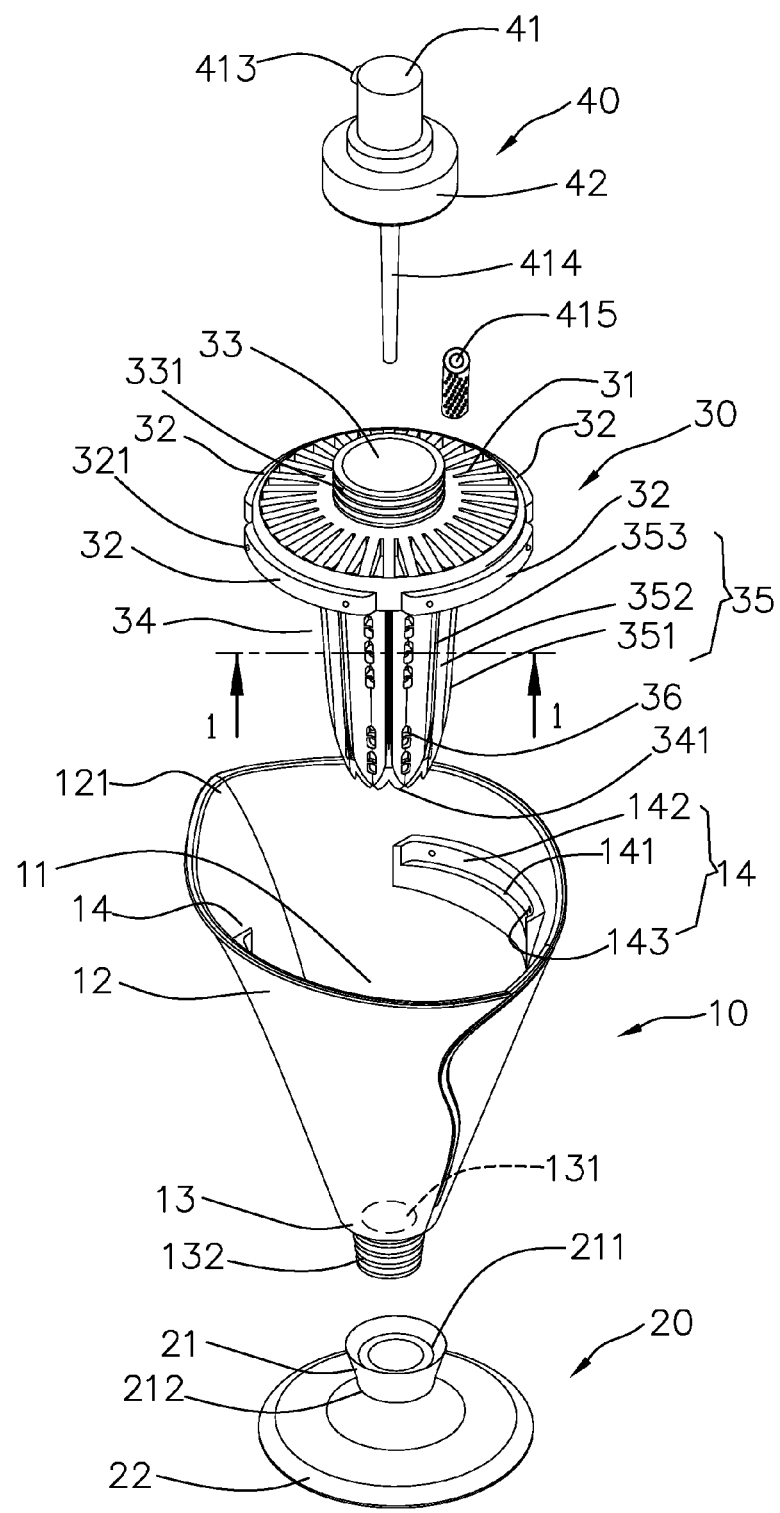
FIG. 1 is a perspective view showing the exploded components of a juice extracting device according to a preferred embodiment of the present invention.

With reference to FIGS. 1-10, a juice extracting device according to a preferred embodiment of the present invention comprises: a collecting assembly 10, a covering set 20, a body 30, and a pumping member 40.

The collecting assembly 10 is used to collect juices and includes a cavity 11 defined therein, an open segment 12 formed on a top end of the cavity 11 and having a pouring hole 121 arranged around an inner wall of the open segment 12, a collection segment 13 formed on a bottom end of the cavity 11 and having a guiding hole 131 defined in the collection segment 13 and an outer screwing section 132 arranged around an outer wall of a bottom end thereof, and at least one limiting seat 14 disposed in the cavity 11 adjacent to the open segment 12; wherein each of the at least one limiting seat 14 has a shoulder 141, a stopping face 142 defined over the shoulder 141, and at least one fixing orifice 143 formed on the stopping face 142.

The covering set 20 is covered on the guiding hole 131 and includes a hollow neck 21 and a circular holder 22 connecting with the hollow neck 21 and used to support the collecting assembly 10, wherein the hollow neck 21 has an inner screwing section 211 defined around an inner wall thereof and a bottom segment 212 connecting with the circular holder 22.

Figure 2:
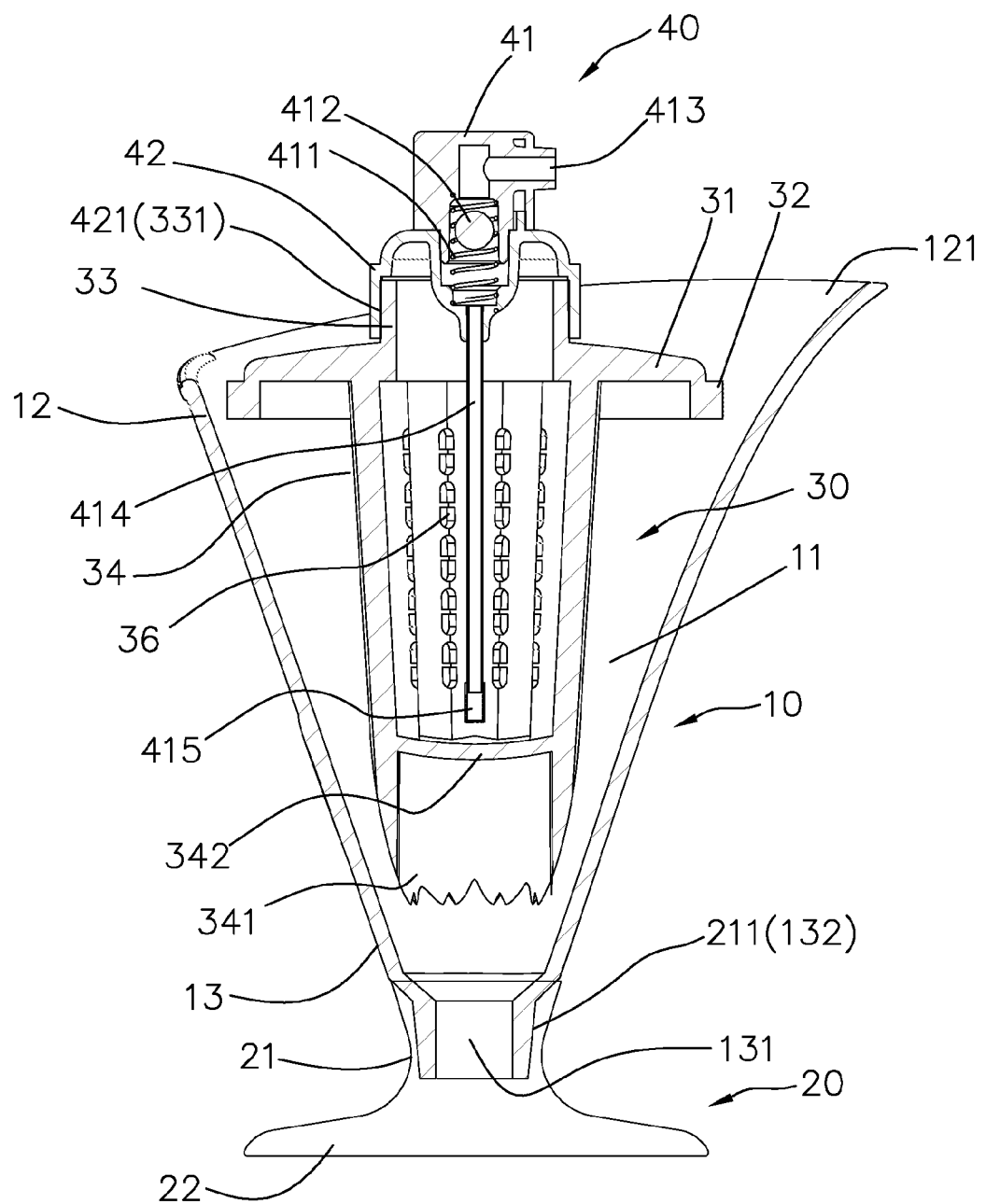
FIG. 2 is a cross sectional view showing the assembly of the juice extracting device according to the preferred embodiment of the present invention.
Figure 3:
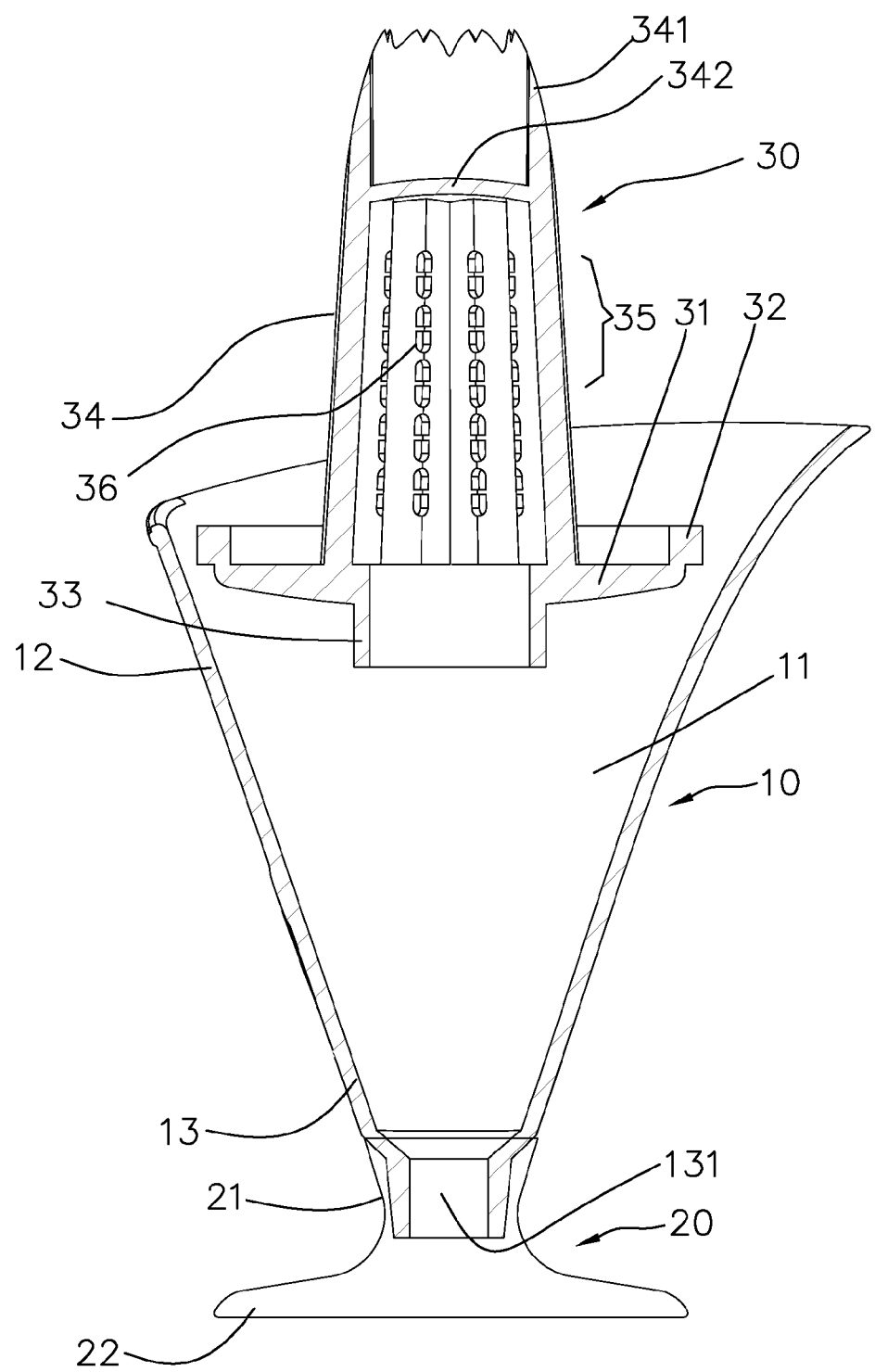
FIG. 3 is another cross sectional view showing the assembly of the juice extracting device according to the preferred embodiment of the present invention.
Figure 4:
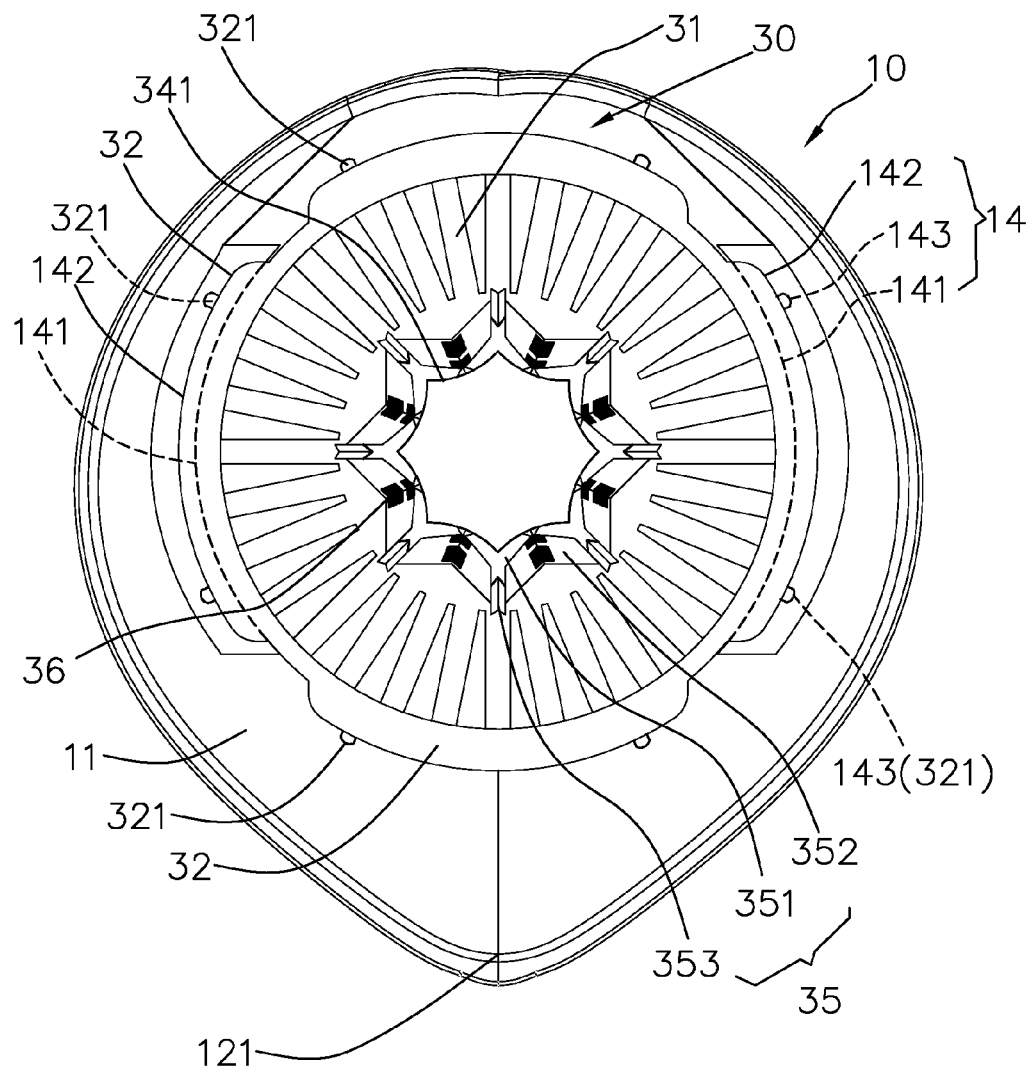
FIG. 4 is a top plan view showing the assembly of the juice extracting device according to the preferred embodiment of the present invention.
Figure 5:
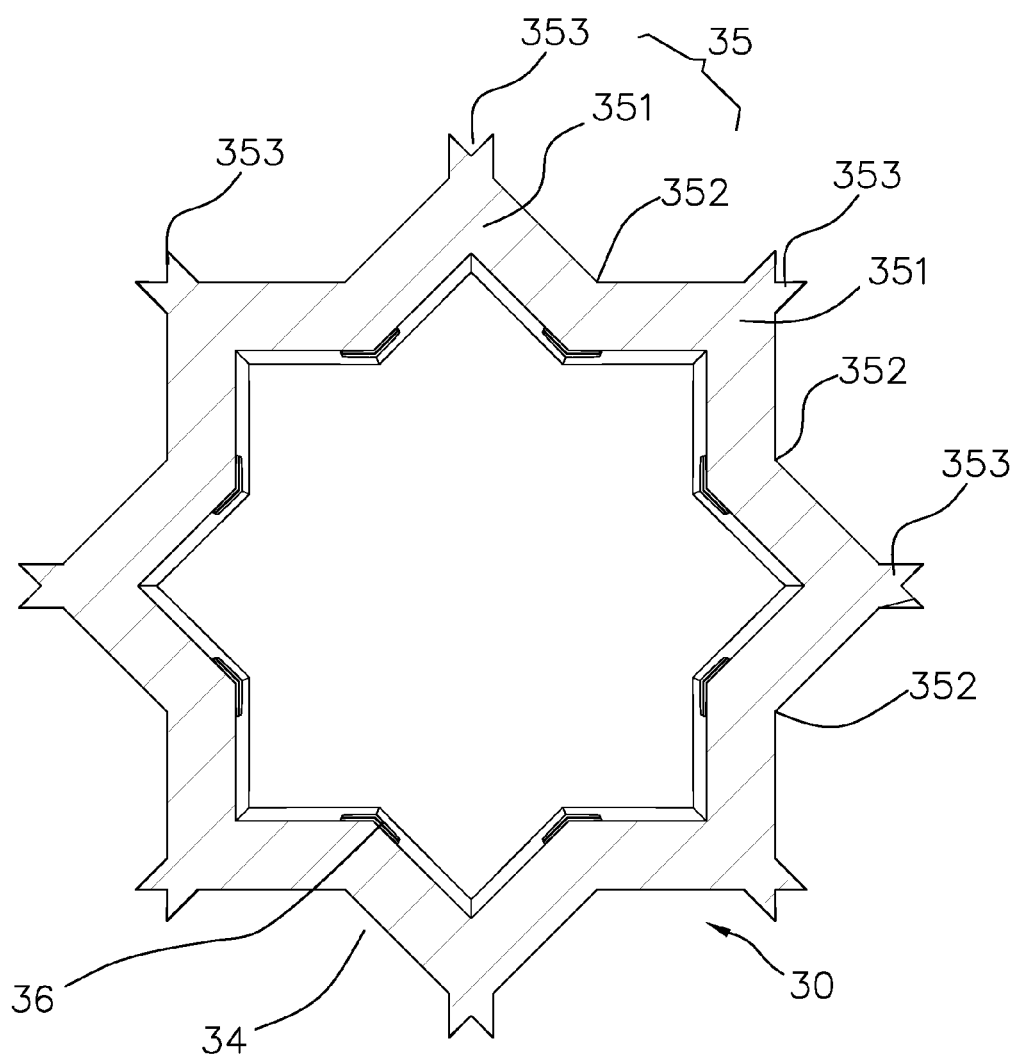
FIG. 5 is a cross sectional view taken along the line 1-1 of FIG. 3.
Figure 6:
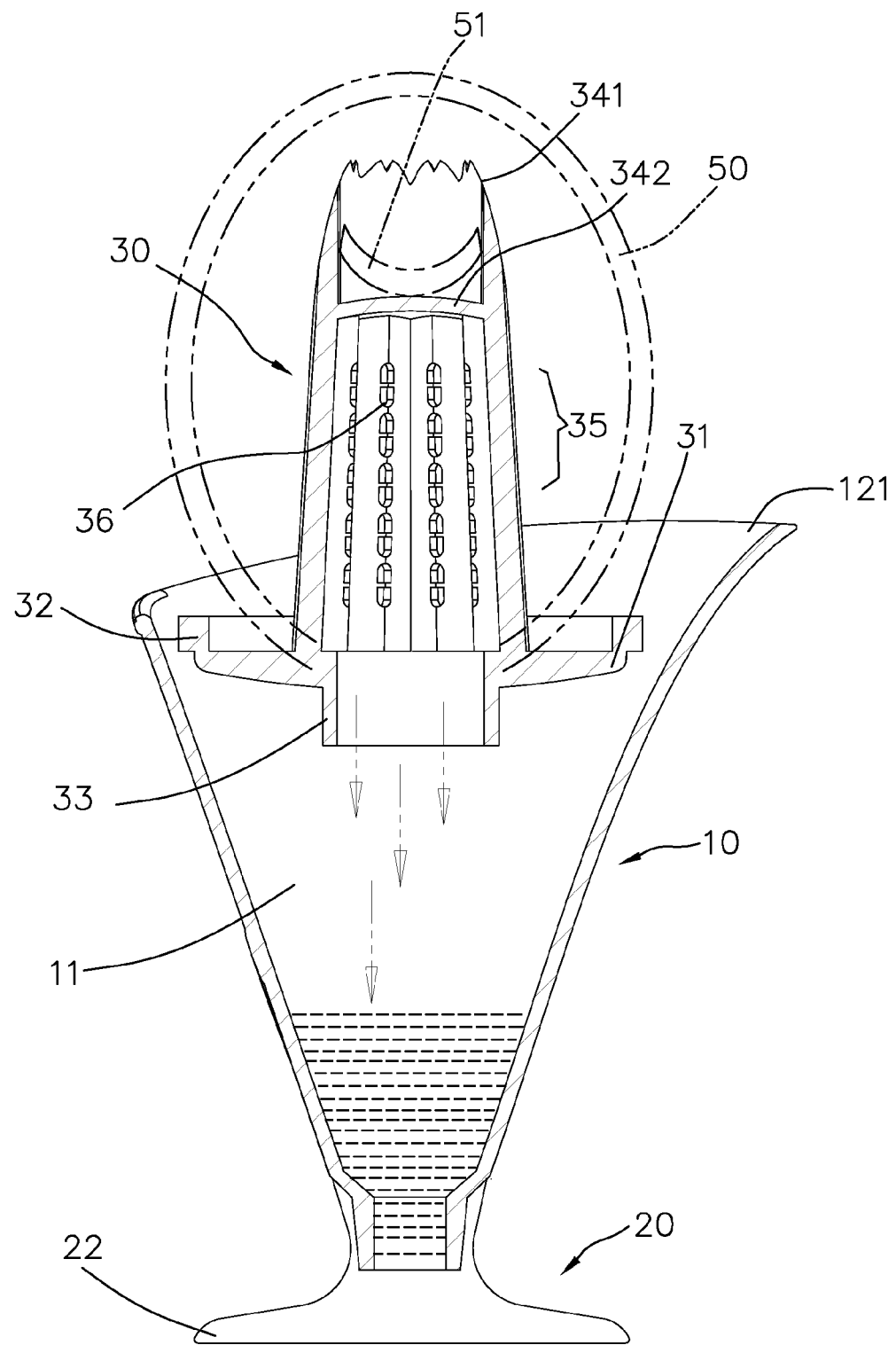
FIG. 6 is a cross sectional view showing the operation of the juice extracting device according to the preferred embodiment of the present invention.

The body 30 is applied to hold the collecting assembly 10 and includes a filtering disc 31; a plurality of defining ribs 32 arranged around an outer peripheral side of the filtering disc 31 so as to retain with the at least one limiting seat 14, wherein each defining rib 32 has at least one boss 321 (as shown in FIG. 4) for retaining with at least one fixing orifice 143; a hollow column 33 extending outwardly from a central portion of a top end of the filtering disc 31, and the hollow column 33 having outer threads 331 formed around an inner wall thereof; a hollowly conical post 34 extending outwardly from a central portion of a bottom end of the filtering disc 31 and communicating with the hollow column 33, wherein the hollowly conical post 34 has a cutting edge 341 arranged on a distal end thereof, and the cutting edge 341 has a plurality of inclined teeth so as to cut and crush a fruit 50. As illustrated in FIGS. 2 and 3, the hollowly conical post 34 also has a stop piece 342 horizontally mounted on a predetermined portion of the cutting edge 341 so as to stop a peel 51 which is peeled from the fruit 50 (as shown in FIG. 6). The hollowly conical post 34 further has an extraction portion 35 formed on an outer wall thereof so as to cut and crush the fruit 50 and has plural first meshes 36 defined thereon. As illustrated in FIG. 5, the extraction portion 35 is comprised of plural cutters 351 and a plurality of slots 352, wherein each cutter 351 has a triangular cross section, and each slot 352 is defined between any two adjacent cutters 351, each cutter 351 also has a crushing fork 353 formed thereon so as to crush pulp of the fruit 50.

The pumping member 40 is served to draw the juices in the collecting assembly 10 and includes a spray head 41 and a cap 42 with inner threads 421 for screwing with the outer threads 331 of the hollow column 33, wherein the spray head 41 has a spring 411 fixed therein, a ball 412 pushed by the spring 411, a spout 413, a drawing tube 414, and a filtration sleeve 415 with plural second meshes, wherein the filtration sleeve 415 is fitted on a bottom end of the drawing tube 414.

With reference to FIGS. 1 and 3, in operation, the outer screwing section 132 of the collecting assembly 10 is screwed with the inner screwing section 211 of the covering set 20, wherein the hollowly conical post 34 of the body 30 extends out of the cavity 11 of the collecting assembly 10, and the plurality of defining ribs 32 of the body 30 retain with the at least one limiting seat 14 (as shown in FIGS. 3 and 4), such that the shoulder 141 and the stopping face 142 limit each rib 32, and each fixing orifice 143 retains with each boss 321, thus connecting the body 30 and the collecting assembly 10 securely. Referring further to FIG. 6, the cutting edge 341 of the hollowly conical post 34 of the body 30 is rotatably inserted into fruit 50 so that the crushing fork 353 of each cutter 351 crushes the pulp of the fruit 50, and the peel 51 is peeled by the cutting edge 341 and is stopped by the stop piece 342, wherein the pulp of the fruit 50 contacts with the extraction portion 35 while rotating the fruit 50. As illustrated in FIGS. 5 and 6, the pulp of the fruit 50 is scraped and crushed by the plural cutters 351 so as to extract the juices. Thereafter, the juices flow into the cavity 11 of the collection assembly 10 along the plurality of slots 352 and are poured outwardly from the pouring hole 121.

Figure 7:
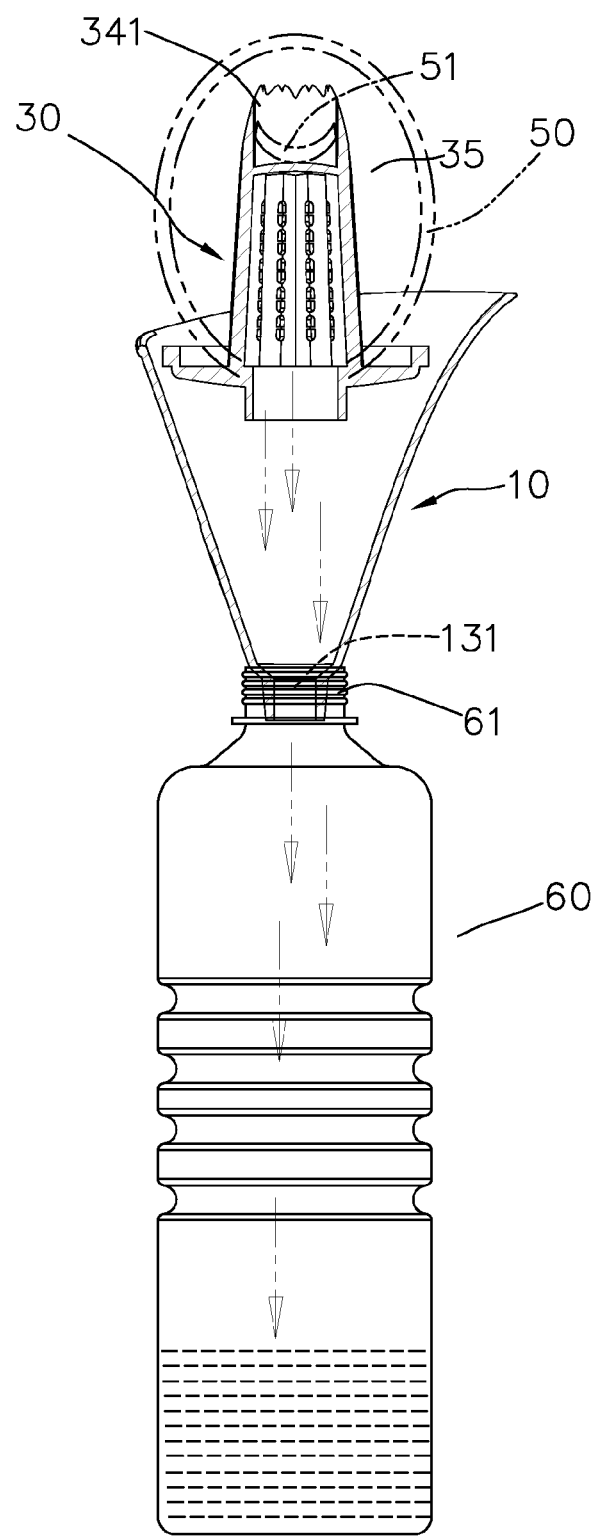
FIG. 7 is another cross sectional view showing the operation of the juice extracting device according to the preferred embodiment of the present invention.
Figure 8:
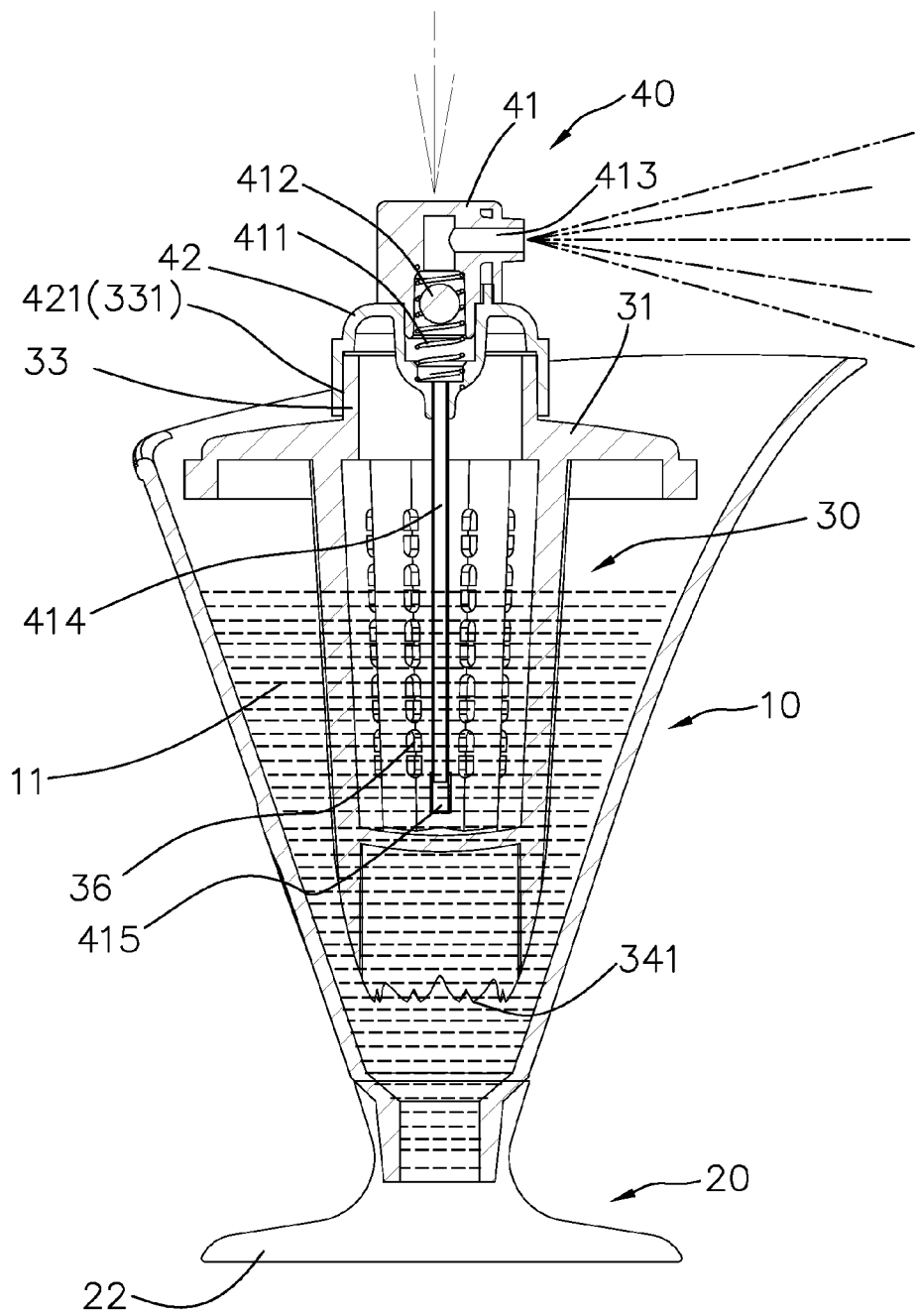
FIG. 8 is also another cross sectional view showing the operation of the juice extracting device according to the preferred embodiment of the present invention.

As shown in FIGS. 1 and 7, after removing the covering member 20, the bottom end of the collecting assembly 10 is inserted into a mouth 61 of a container 60 so that the juices flow into the container 60 via the plurality of slots 352, the guiding hole 131, and the mouth 61. Referring to FIG. 8, as desiring to spray the juices out of the cavity 11, the hollowly conical post 34 of the body 30 is inserted into the cavity 11 of the collecting assembly 10, and the plurality of defining ribs 32 of the body 30 retain with the at least one limiting seat 14 so as to connect the body 30 and the collecting assembly 10 together, and then the inner threads 421 of the cap 42 are screwed with the outer threads 331 of the hollow column 33, the drawing tube 414 is inserted into the body 30, such that when the spray head 41 is pressed, the spring 411 and the ball 412 are driven by the spray head 41 to drive the drawing tube 414 to draw the juices out of the cavity 11, and then the juices are sprayed on barbecue foods via the spout 413.

Figure 9:
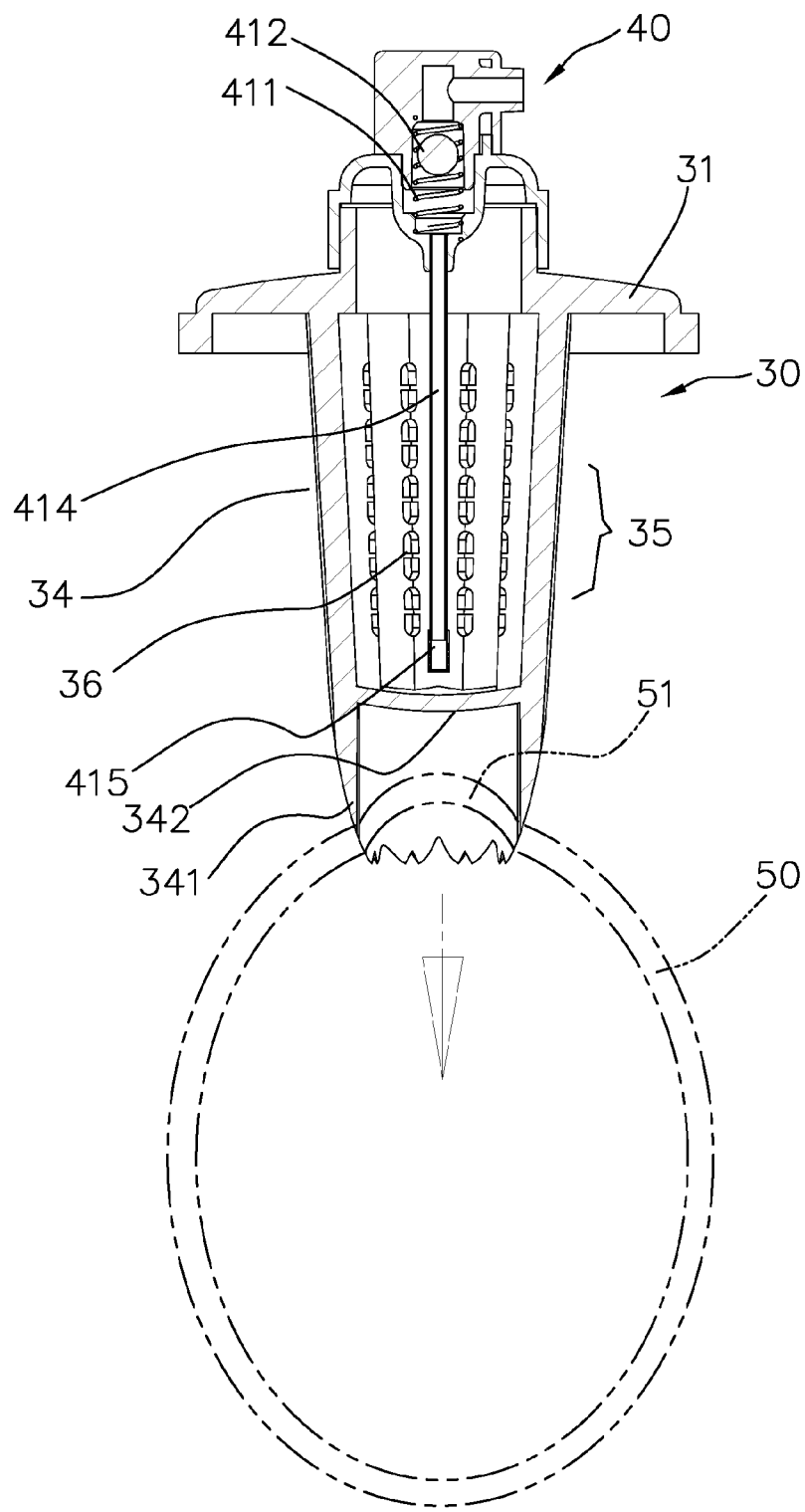
FIG. 9 is still another perspective view showing the operation of the juice extracting device according to the preferred embodiment of the present invention.
Figure 10:
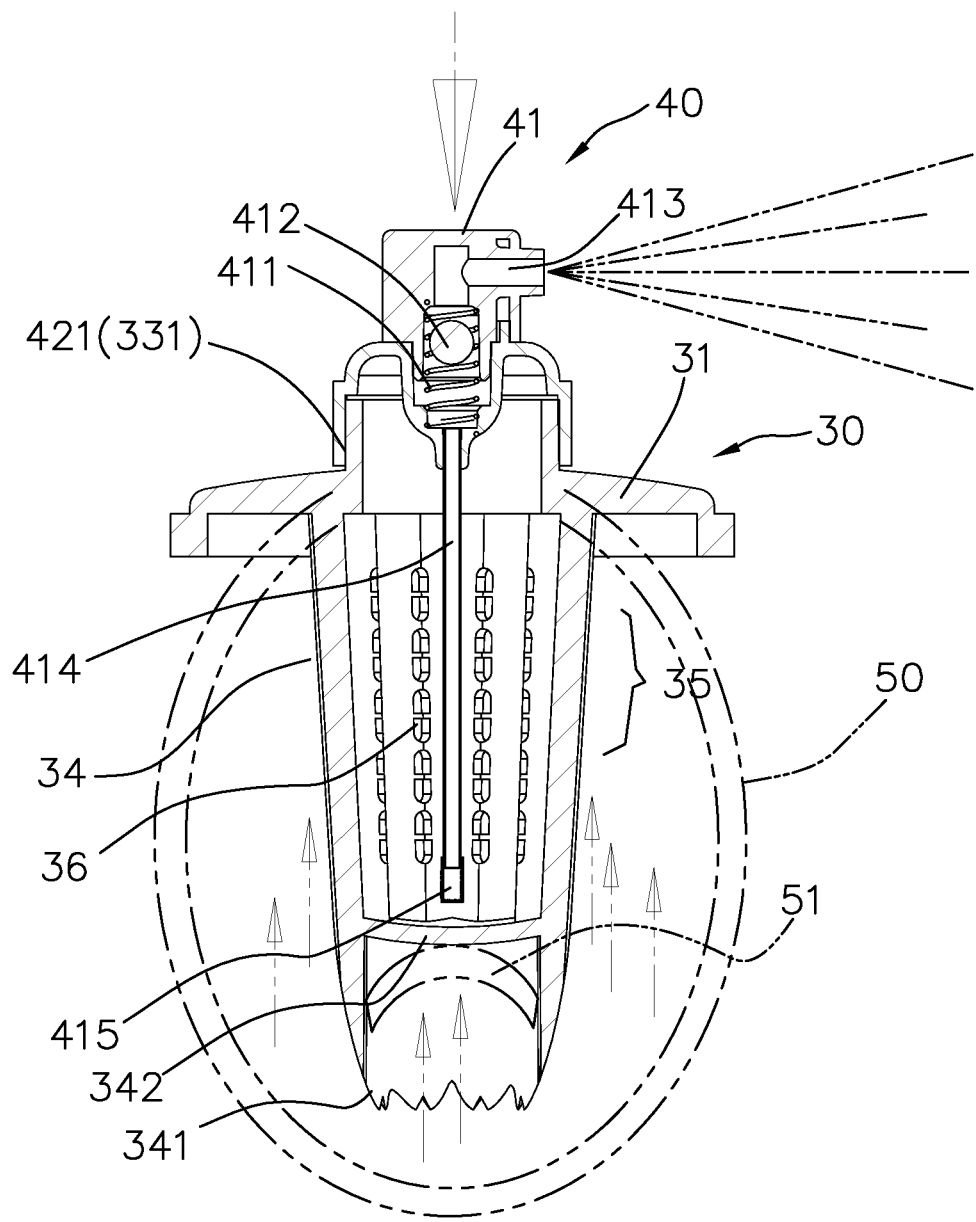
FIG. 10 is another perspective view showing the operation of the juice extracting device according to the preferred embodiment of the present invention.

With reference to FIGS. 9 and 10, the cutting edge 341 of the hollowly conical post 34 is rotatably inserted into the fruit 50 so as to peel the peel 51, and then the peel 51 is stopped by the stop piece 342, wherein the pulp of the fruit 50 contacts with the extraction portion 35 while rotating the fruit 50, such that the pulp of the fruit 50 is scraped and crushed by the plural cutters 351 so as to extract the juices. Thereafter, the spray head 41 is pressed, the spring 411 and the ball 412 are driven by the spray head 41 to drive the drawing tube 414 to draw the juices out of the fruit 50, and then the juices are sprayed out of the spout 413.

Accordingly, the juice extracting device of the present invention is capable of extracting the juices variously. Preferably, the stop piece 342 stops the peel 51 so that the juice extracting device extracts the juices without impurities. In addition, the crushing fork 353 of each cutter 351 crushes the pulp of the fruit 50 strongly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A juice extracting device comprising:
   a collecting assembly used to collect juices and including a cavity defined therein, an open segment formed on a top end of the cavity and having a pouring hole arranged around an inner wall of the open segment, a collection segment formed on a bottom end of the cavity and having a guiding hole defined in the collection segment, and at least one limiting seat disposed in the cavity adjacent to the open segment;
   a covering set covered on the guiding hole and including a hollow neck and a circular holder connecting with the hollow neck and used to support the collecting assembly;
   a body applied to hold the collecting assembly and including a filtering disc; a plurality of defining ribs arranged around an outer peripheral side of the filtering disc so as to retain with the at least one limiting seat; a hollow column extending outwardly from a central portion of a top end of the filtering disc; a hollowly conical post extending outwardly from a central portion of a bottom end of the filtering disc and communicating with the hollow column, wherein the hollowly conical post has a cutting edge arranged on a distal end thereof, the hollowly conical post also has a stop piece horizontally mounted on a predetermined portion of the cutting edge so as to stop a peel which is peeled from a fruit; the hollowly conical post further has an extraction portion formed on an outer wall thereof so as to cut and crush the fruit and has plural first meshes defined thereon;
   a pumping member served to draw the juices in the collecting assembly and includes a spray head and a drawing tube for drawing the juices.

2. The juice extracting device as claimed in claim 1, wherein the extraction portion is comprised of plural cutters and a plurality of slots, and each cutter has a triangular cross section, and each slot is defined between any two adjacent cutters, each cutter also has a crushing fork formed thereon so as to crush pulp of the fruit.

3. The juice extracting device as claimed in claim 1, wherein the collection segment has an outer screwing section arranged around an outer wall of a bottom end thereof.

4. The juice extracting device as claimed in claim 1, wherein each of the at least one limiting seat has a shoulder, a stopping face defined over the shoulder, and at least one fixing orifice formed on the stopping face; and each defining rib has at least one boss for retaining with at least one fixing orifice.

5. The juice extracting device as claimed in claim 1, wherein the hollow column has outer threads formed around an inner wall thereof; and the pumping member includes a cap with inner threads for screwing with the outer threads of the hollow column.

6. The juice extracting device as claimed in claim 1, wherein the spray head has a spring fixed therein, a ball pushed by the spring, a spout, and a filtration sleeve with plural second meshes, wherein the filtration sleeve is fitted on a bottom end of the drawing tube.

7. The juice extracting device as claimed in claim 1, wherein the cutting edge has a plurality of inclined teeth for cutting and crushing the fruit.

* * * * *